United States Patent
Hong et al.

(10) Patent No.: US 12,014,497 B2
(45) Date of Patent: Jun. 18, 2024

(54) SUMMING TREE STRUCTURAL MOTION-CORRECTION ALGORITHM FOR MEDICAL IMAGES USING 3D TO 2D PROJECTION

(71) Applicant: Siemens Medical Solutions USA, Inc., Malvern, PA (US)

(72) Inventors: Inki Hong, Knoxville, TN (US); Ziad Burbar, Knoxville, TN (US); Paul Schleyer, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 394 days.

(21) Appl. No.: 17/596,907

(22) PCT Filed: Oct. 4, 2019

(86) PCT No.: PCT/US2019/054609
§ 371 (c)(1),
(2) Date: Dec. 21, 2021

(87) PCT Pub. No.: WO2021/066835
PCT Pub. Date: Apr. 8, 2021

(65) Prior Publication Data
US 2022/0309652 A1 Sep. 29, 2022

(51) Int. Cl.
*G06T 7/00* (2017.01)
*G06T 7/38* (2017.01)

(52) U.S. Cl.
CPC ........... *G06T 7/0012* (2013.01); *G06T 7/38* (2017.01); *G06T 2200/04* (2013.01); *G06T 2200/24* (2013.01); *G06T 2207/10081* (2013.01); *G06T 2207/10088* (2013.01); *G06T 2207/10104* (2013.01); *G06T 2207/10108* (2013.01); *G06T 2207/10116* (2013.01); *G06T 2207/10132* (2013.01)

(58) Field of Classification Search
CPC ....... G06T 11/008; G06T 7/0012; G06T 7/38; G06T 2207/10132; G06T 2207/10116; G06T 2200/24; G06T 2211/412; G06T 2207/10088; G06T 2200/04; G06T 2207/10081; G06T 2207/10108; G06T 2207/10104
See application file for complete search history.

(56) References Cited

U.S. PATENT DOCUMENTS

| | | | |
|---|---|---|---|
| 7,397,035 B2 | 7/2008 | Watson | |
| 7,477,252 B2 * | 1/2009 | Chun | H04N 13/393 348/E13.056 |
| 9,510,800 B2 | 12/2016 | Verma | |
| 10,489,683 B1 * | 11/2019 | Koh | G06F 18/213 |
| 2017/0018098 A1 * | 1/2017 | Simon | G06T 11/006 |

OTHER PUBLICATIONS

Liu Xuan et al: "Practical pseudo-3D registration for large tomographic images", Proceedings of SPIE/ IS & T , vol. 9212, Sep. 11, 2014 (Sep. 11, 2014), pp. 921208-921208.
International Search Report for Corresponding PCT Application No. PCT/US2019/054609 dated Apr. 29, 2020.

* cited by examiner

*Primary Examiner* — Congvan Tran

(57) ABSTRACT

Disclosed herein are novel techniques that address blurriness in medical images resulting from motion of a rigid body, such as a patient, relative to the medical scanning equipment by using a motion-correction algorithm for 3D medical images using to two-dimensional projections.

17 Claims, 12 Drawing Sheets

SUMMING TREE STRUCTURAL MOTION-CORRECTION ALGORITHM FOR MEDICAL IMAGES USING 3D TO 2D PROJECTION

FIELD

The present disclosure relates to medical imaging. More particularly, this disclosure relates to motion-correction of three-dimensional (3D) medical images.

BACKGROUND

Medical images are frequently used in the diagnosis of medical disorders. With advances in computer and image processing, 3D medical images are increasingly used in medical investigations. Various types of 3D medical imaging techniques exist including, e.g., computer tomography (CT), positron emission tomography (PET), magnetic resonance imaging (MRI or MR), single-photon emission computerized tomography (SPECT), and ultrasounds, among others.

Each of the above examples generate 3D medical images in different ways. For example, CT scanning employs multiple X-ray images taken in multiple directions (i.e., with a scanner situated in different orientations relative to a patient) to generate a 3-dimensional image or multiple tomographic image slices. CT scanning generally has higher resolution, shorter scan times, and is superior for providing structural data such as the structure of bones, organs, etc.

As another example, PET scanning employs a gamma-emitting radiopharmaceutical ingested by a patient or injected into a patient. Multiple gamma ray images are taken in multiple directions to generate a 3-dimensional PET image or multiple slices. PET scanning generally has lower resolution but provides more useful information regarding the functional condition of body tissues and systems such as the cardiovascular system. PET is superior for indicating the presence of soft tissue tumors or decreased blood flow to certain organs or areas of the body, for example. PET scanning requires a relatively long duration data acquisition period, on the order of several minutes (e.g., about 30 minutes) for a typical clinically sufficient image. Typically, a large number of PET data acquisitions are acquired at many different angles during this period.

While CT and PET scanning use different techniques to generate medical imaging data, each of these particular examples, as well as other medical imaging techniques, can be susceptible to both expected and unexpected relative motion that occurs between the scanning instrument and the scanned patient. Many techniques for correcting or accounting for this relative motion have been developed. For example, gated scanning, as discussed in U.S. Pat. No. 9,510,800, has addressed some causes of motion-induced blurring by identifying and exploiting a physiological signal (e.g., respiratory or cardiac signal) of the patient. By measuring such a physiological signal, the expected motion of a patient and/or particular target within a patient (e.g., lung or heart) can be determined during an acquisition. This information can be used to detect time intervals (referred to as gates, time gates, or time windows) of relatively little organ motion during which the image can be taken, or from which the image data can be accepted for reconstructing the data set (with the data from periods of greater motion being discarded).

While current techniques, like gated scanning described above, result in some improvements to motion-induced blurriness in medical images for predictable motion, such techniques are less useful for unexpected motion, such as a patient sneezing. One current technique to address unexpected patient motion uses additional equipment (such as a camera) to measure the motion of a patient and then uses these measurements to correct the received image data. Unfortunately, patient movement can occur so rapidly during a short period of time that current methods cannot correct the data collected during this movement. Often, this data is simply discarded. If the uncorrected data is not discarded, the final image will be compromised resulting in a blurry image that is not as useful or, in some cases, cannot be used at all.

Thus, improved methods for correcting motion-induced blurriness in medical images is desired.

SUMMARY

Disclosed herein are novel techniques that address blurriness in medical images resulting from motion of a target subject, such as a patient, relative to the medical scanning equipment during an imaging acquisition session by using a summing tree structural motion-correction algorithm for 3D medical images using to two-dimensional ("2D") projection.

A computer-implemented method of processing data for medical imaging is disclosed in accordance with some embodiments. The disclosed methods can be carried out by a computer within the medical imaging system that is tasked with processing the image data from the imaging acquisition session. Alternatively, the disclosed methods can be carried out by a computer system that is external to the medical imaging system. The method can comprise receiving a first set of data representing a first three-dimensional medical image and generating a first two-dimensional medical image by projecting the first set of data onto a first plane. The method can further comprise receiving a second set of data representing a second three-dimensional medical image and generating a second two-dimensional medical image by projecting the second set of data onto the first plane. A spatial registration that exists between the first two-dimensional medical image and the second two-dimensional medical image in the first plane can be calculated. Using the calculated spatial registration, a correction vector can be generated. The correction vector can be applied to one or more of the datum in the second set of data, thereby modifying it. A combined set of data representing a processed three-dimensional medical image can be generated by combining the first set of data and the modified second set of data. This method can be iteratively performed in two additional planes, wherein each plane is orthogonal to the other two planes. Additionally, this method can be iteratively performed for additional sets of data, each set representing a different three-dimensional medical image.

Figure 1:
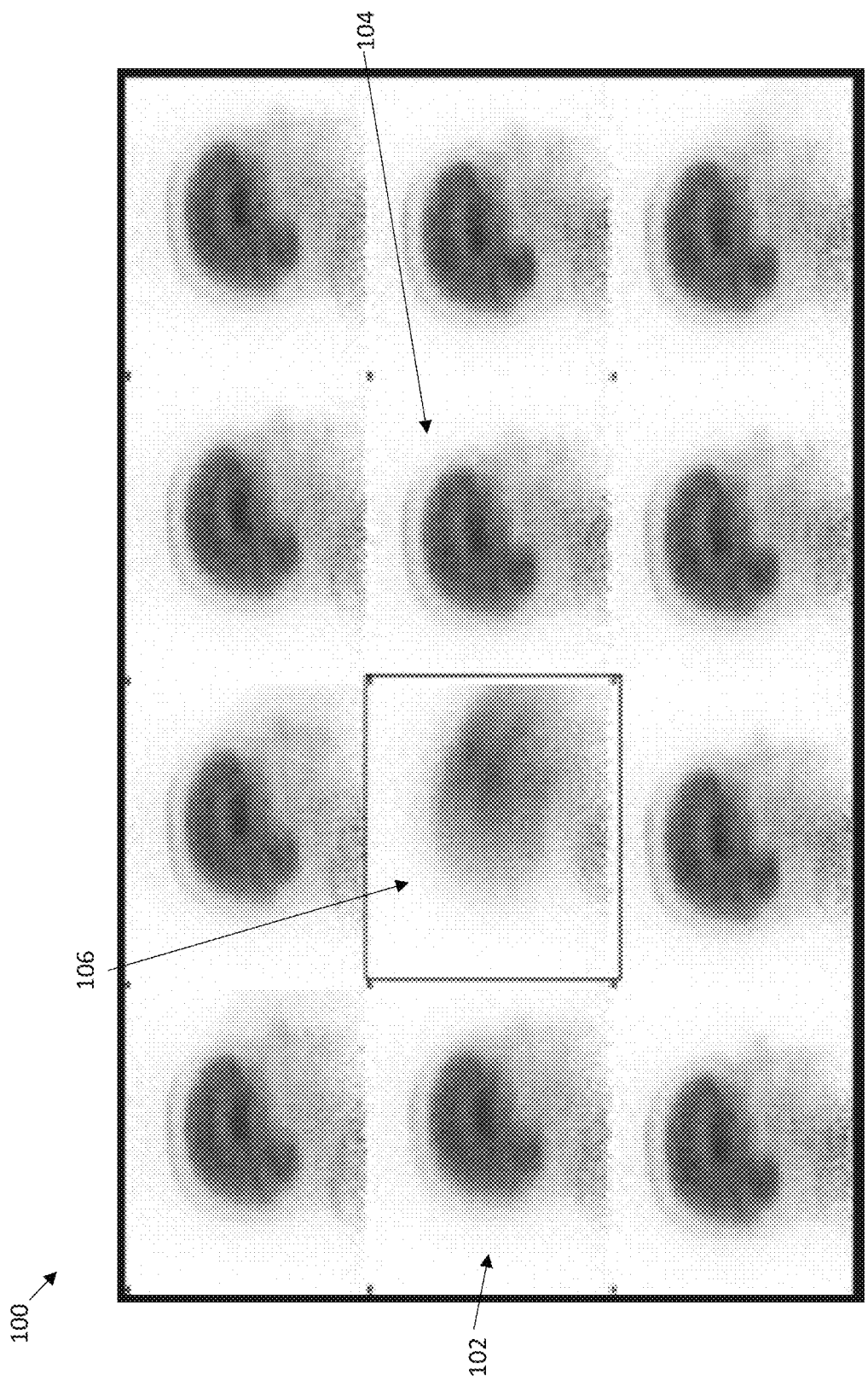
FIG. 1 illustrates a series of frames from a PET scan.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

This description of the exemplary embodiments is intended to be read in connection with the accompanying drawings, which are to be considered part of the entire written description. To promote an understanding of the principles of the disclosure, reference will now be made to a number of illustrative embodiments in the drawings and specific language will be used to describe the same.

FIG. 1 illustrates a series of twelve PET medical image frames 100, each frame has a duration of two seconds using time-of-flight back projection, taken from a 20 minute, high resolution PET brain study using a Siemens Biogprah Vision PET scanner in listmode. The series of frames 100 are ordered chronologically from left to right, top to bottom. Most of these frames, such as frames 102 and 104, occur during periods of little-to-no patient movement. Consequently, the data from these images provides medically relevant details useful in diagnosis and other analyses. On the other hand, frame 106 demonstrates the blurring effects of a rapid movement caused by the patient sneezing during the PET scan. Both the change in the position of the patient and the effect on the received data is readily apparent to a person of ordinary skill ("POSA") through a visual comparison of frame 106 to frames 102 and 104 (the frames immediate before and after frame 106).

Figures 2A, 2B, 2C:
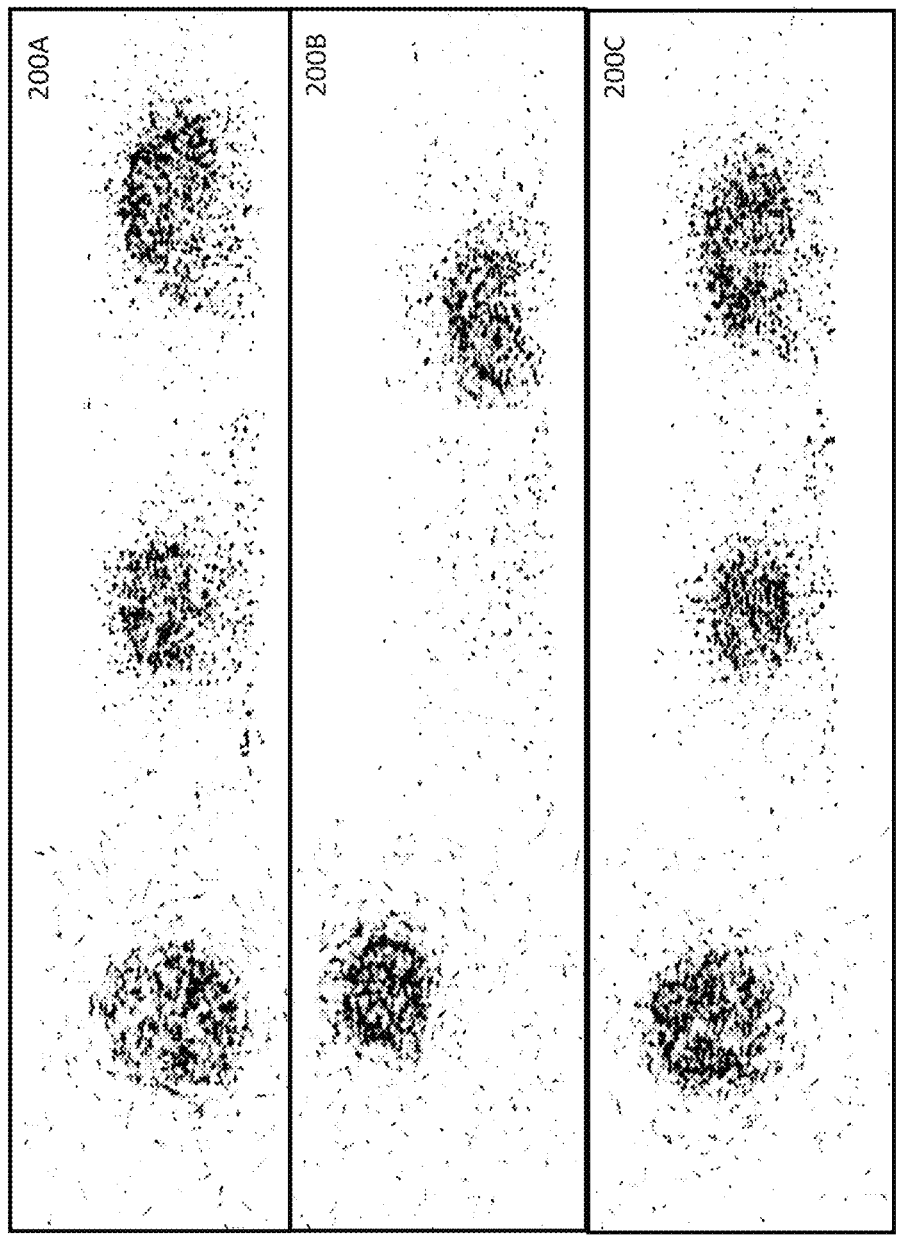
FIGS. 2A to 2C illustrate reconstructed images from a selected frame of the series of frames in FIG. 1.

FIGS. 2A-2C illustrate different planar views of reconstructed, non-attenuated images 200A to 200C formed by the data received during the frame 106 from FIG. 1. More specifically, FIG. 2A illustrates the reconstructed image 200A from 100 msec of data beginning at time zero (i.e., at the start of the 2 second duration from which frame 106 is composed), FIG. 2B shows the reconstructed image 200B from 100 msec of data beginning at one second into frame 106, and FIG. 2C shows the reconstructed image 200C from 100 msec of data beginning at one-and-a-half seconds into frame 106. In each of the FIGS. 2A to 2C, the left-most image is the reconstructed image as observed in the x-y plane, the center image is the reconstructed image as observed in the x-z plane, and the right-most image is the reconstructed image as observed in the y-z plane. These images are too noisy for conventional correction techniques, and too blurry to provide medically relevant data.

Figure 3:
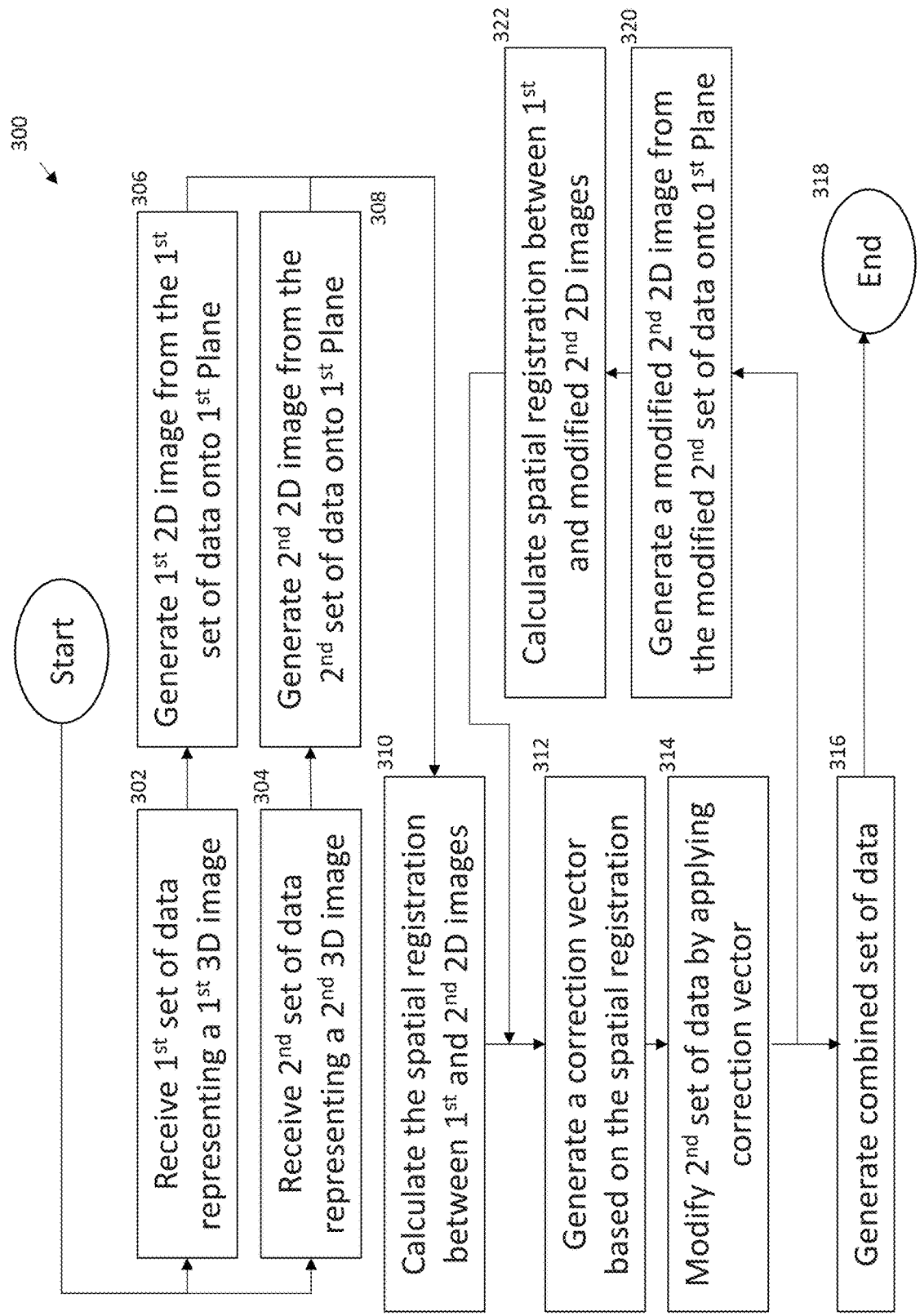
FIG. 3 shows a flowchart for the computer-implemented method for correcting motion from images according to some embodiments.

According to some embodiments, a computer-implemented method 300 for correcting motion from a medical image is provided in FIG. 3. The method starts at blocks 302 and 304. At Block 302 a first set of data representing a first 3D medical image is received from a medical imaging instrument/system's image data acquisition components, such as the scan detectors in PET, SPECT, CT, MRI (or MR), ultrasound, x-ray imaging systems.

As used herein, medical image refers to an image constructed from any type of medical imaging system, and can include PET, SPECT, CT, MRI (or MR), ultrasound, x-ray, and other medical imaging techniques. Further, while embodiments illustrating the advantages of the present disclosure utilize a human patient as the target, a POSA will recognize that advantages of the methods disclosed herein are applicable to any target of a medical image that can move relative to the imaging apparatus.

At Block 304 a second set of data representing a second 3D medical image is received from a medical imaging instrument/system's image data acquisition components, such as the scan detectors in PET, SPECT, CT, MRI (or MR), ultrasound, x-ray imaging systems. At Block 306 the first set of data is projected on a first plane to generate a first 2D image. Similarly, at Block 308 the second set of data is projected on the first plane to generate a second 2D image.

Figure 4:
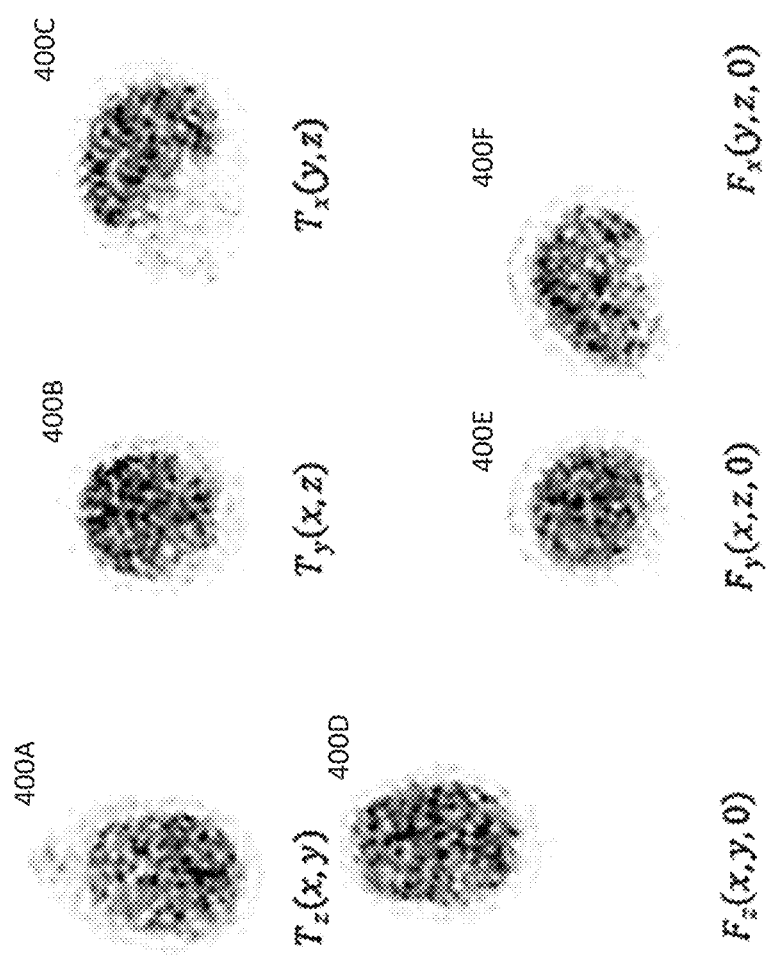
FIG. 4 illustrates 2D images of 3D medical imaging data as projected onto a plane according to some embodiments.

FIG. 4 illustrates six examples (400A to 400F) of 2D medical images formed by projecting a set of three-dimensional medical image data on various orthogonal planes (i.e., the x-y, x-z, and y-z planes). As a POSA understands, the unprocessed set of data represents a 3D image by storing the x-y-z coordinates of each detected emission event during the time period of interest. These coordinates can be used to visually represent the location of each event on a display.

To project a set of 3D data onto a plane, data along the axis (e.g., the z axis) down which the image is displayed is simply ignored, leaving only x and y data as projected on the x-y plane. For example, image 400A illustrates only the data projected on the x-y plane and the view is down the z axis. Similarly, image 400B illustrates the x-z projection of data looking down the y axis, and image 400C illustrates the y-z data looking down the x axis.

In the example provided in FIG. 4, one set of the images, 400A, 400B, and 400C is designated as the target ("T") image and designated $T_z$, $T_y$, and $T_x$, respectfully. As used herein, a target image is the image to which another image is corrected. Other images that are corrected to the target image are referred to as floating ("F") images. FIG. 4 illustrates three floating images: 400D, 400E, and 400F. These floating images are designated using one of the $F_z$, $F_y$, or $F_x$ labels. Similar to target images, floating image 400D illustrates the x and y data as projected onto the x-y plane, image 400E illustrates the x and z data as projected on the x-z plane, and image 400F illustrates the y and z data as projected on the y-z plane. For each floating image 400D, 400E, and 400F, the '0' refers to the number of iterations of the methods described herein that have been applied to the floating image set of data.

With reference to FIG. 3, the first set of data can represent the target image and the second set of data can represent the floating image and each of the first 2D image and second 2D image represents the projection of the respective set of data representing a 3D medical image onto one of the planes (x-y, x-z, or y-z).

At Block 310 a spatial registration that exists between the first 2D medical image and the second 2D medical image in the first plane is calculated. The spatial registration is calculated by comparing the first and second 2D medical images and determining the modifications required to correct, or move, the second 2D image onto first 2D image, thereby reducing or eliminating the effects of the movement of the patient. This determination can be made by a trained technician, a computer algorithm, or both. For example, a technician can view the relative locations of perceptible structures or other features in both images and manipulate the positioning of one or more of the 2D images until a "best fit" is achieved. Likewise, a computer algorithm can perform a similar process, or recommend a best fit that is reviewed and/or edited by a technician. The system on which the images are manipulated can then measure or be used to measure the translation and/or the rotation required to correct the second two-dimensional, floating medical image relative to the first two-dimensional medical image.

Three-dimensional images subject to rapid movement can be too noisy for an effective comparison with other images to determine the spatial registration in three dimensions. Projecting the set of 3D data onto a single plane advantageously provides a more effective and reliable determination of the spatial registration between two sets of data, thereby providing for better correction of the motion of a patient and clearer, more usable images from which diagnosis can be made.

At Block 312, a correction vector based on the calculated spatial registration is generated. The correction vector is a set of values that will be applied to the raw 3D data in order to remove the effects of patient movement. For example, if the floating image was determined to have translated in the x-y plane by 2 units in the x direction and 3 units in the y direction, and to have been rotated 10 degrees about the z axis relative to the target image, the correction vector can be set to −2 units in the x direction, −3 units in the y direction, −10 degrees of rotation about the Z axis. The second set of data is then modified, at Block 314, by applying the correction vector to one or more of the datum in the second set of data, thereby removing the patient's movement from the second set of data.

If the modification of the second set of data sufficiently registers the second 2D image to the first 2D image, which can be observed by noting minimal spatial differences between the images, method 300 proceeds to Block 316. However, if the modification of the second set of data does not sufficiently register the second 2D image to the first 2D image, method 300 proceeds to Block 320 at which a modified second 2D image is generated from the modified second set of data. A new spatial registration between the first 2D image and the modified second 2D image is calculated at Block 322. Method 300 then returns to Block 312. Method 300 can iterate Blocks 312, 314, 320 and 322 until the second 2D image is sufficiently registered. This iterative process results in a more efficient and effective correction of the motion of the target.

A combined set of data representing a processed three-dimensional medical image is then generated, at Block 316, by combining the first set of data and the modified second set of data, as modified by the correction vector at Block 314. In some embodiments, the combined set of data can be transmitted to, e.g., a remote location such as an external computer system. In some embodiments, the combined set of data can be displayed, thereby showing a medical image in which the effects of motion have been reduced or removed. Method 300 ends at Block 318.

Figure 5:
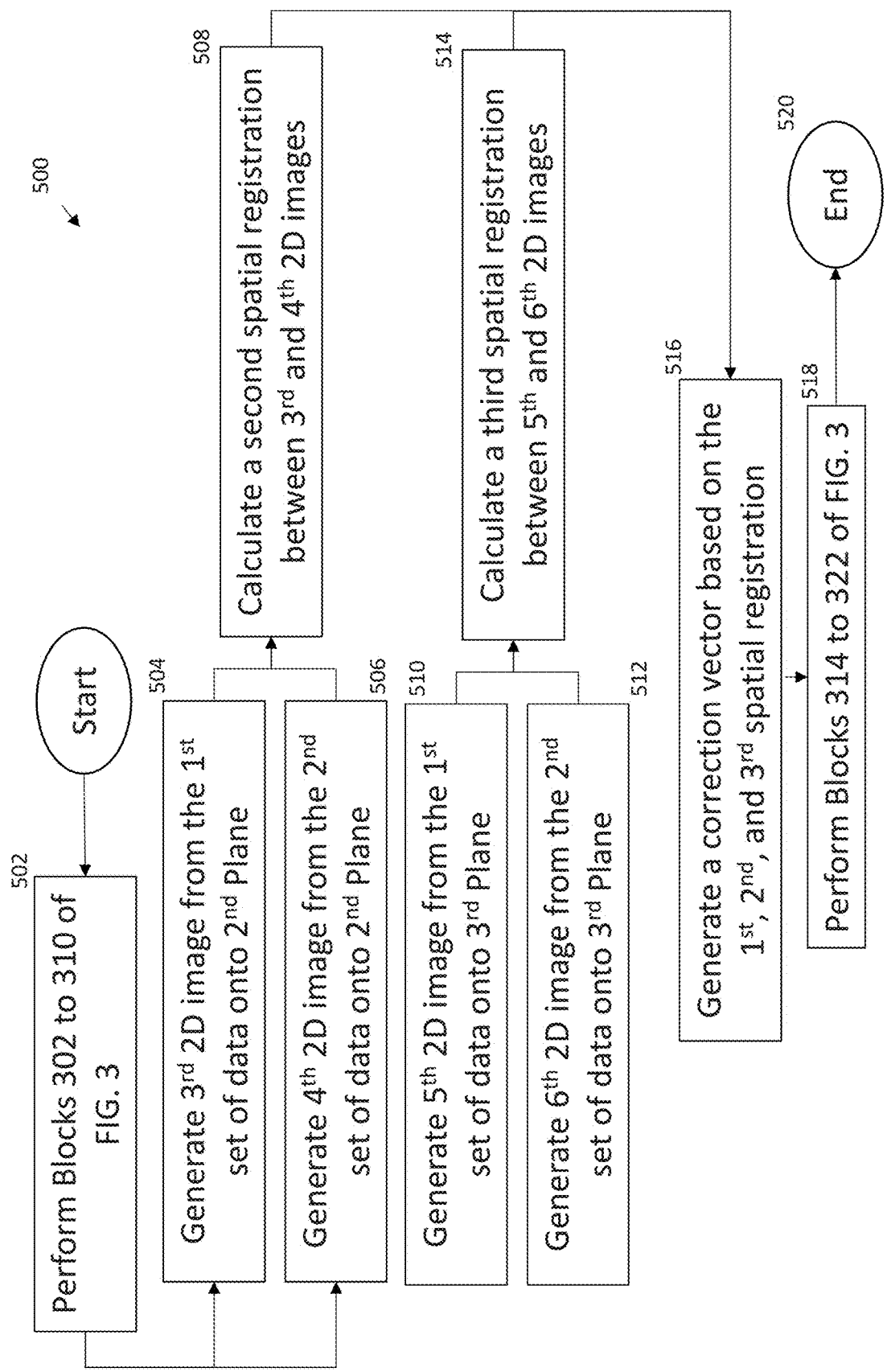
FIG. 5 shows a flowchart for another computer-implemented method for correcting motion from images according to some embodiments.

FIG. 5 illustrates a computer-implemented method 500 of correcting motion from medical images in accordance with some embodiments. Method 500 begins at Block 502 in which Blocks 302 to 310 of FIG. 3 are performed. At Block 504, a third two-dimensional medical image is generated by projecting, as described above, the first set of data onto a second plane. The second plane is orthogonal to the first plane. At Block 506, a fourth two-dimensional medical image is generated by projecting, as described above, the second set of data onto the second plane. At Block 508, a second spatial registration that exists between the third two-dimensional medical image and the fourth two-dimensional medical image in the second plane is calculated as described above. Similarly Blocks 510 and 512 generate a fifth and sixth 2D image by projection the respective set of data on a third plane that is orthogonal to both the first and second planes, and at Block 514 a third spatial registration is calculated.

Method 500 continues at Block 516, in which a correction vector based on the first, second, and third spatial registrations is generated as described above, only in each of the three planes (e.g., the other two planes as of FIG. 4) rather than only one plane as described with respect to FIG. 3. As a POSA will recognize, data in one dimension, e.g., the x dimension, will be effected by multiple correction vector(s) (and therefore, calculated spatial registration(s)) generated from multiple planar projection views. For example, data in the 'x' dimension will appear in both the x-y, and x-z planes. Therefore, the spatial registrations values calculated with respect to each plane will both provide an input into the correction vector, e.g., by summing the two values together. In some embodiments, these spatial registrations values for a given dimension can be averaged together.

By calculating the spatial registration (and therefore, the movement of the patient) in each plane separate from the others, more effective and reliable motion correction can be made as excessive noise that would occur in a 3D medical image is reduced by using 2D projections.

At Block 518, Blocks 314 to 318 of FIG. 3 are performed. Method 500 ends at Block 520.

Figure 6:
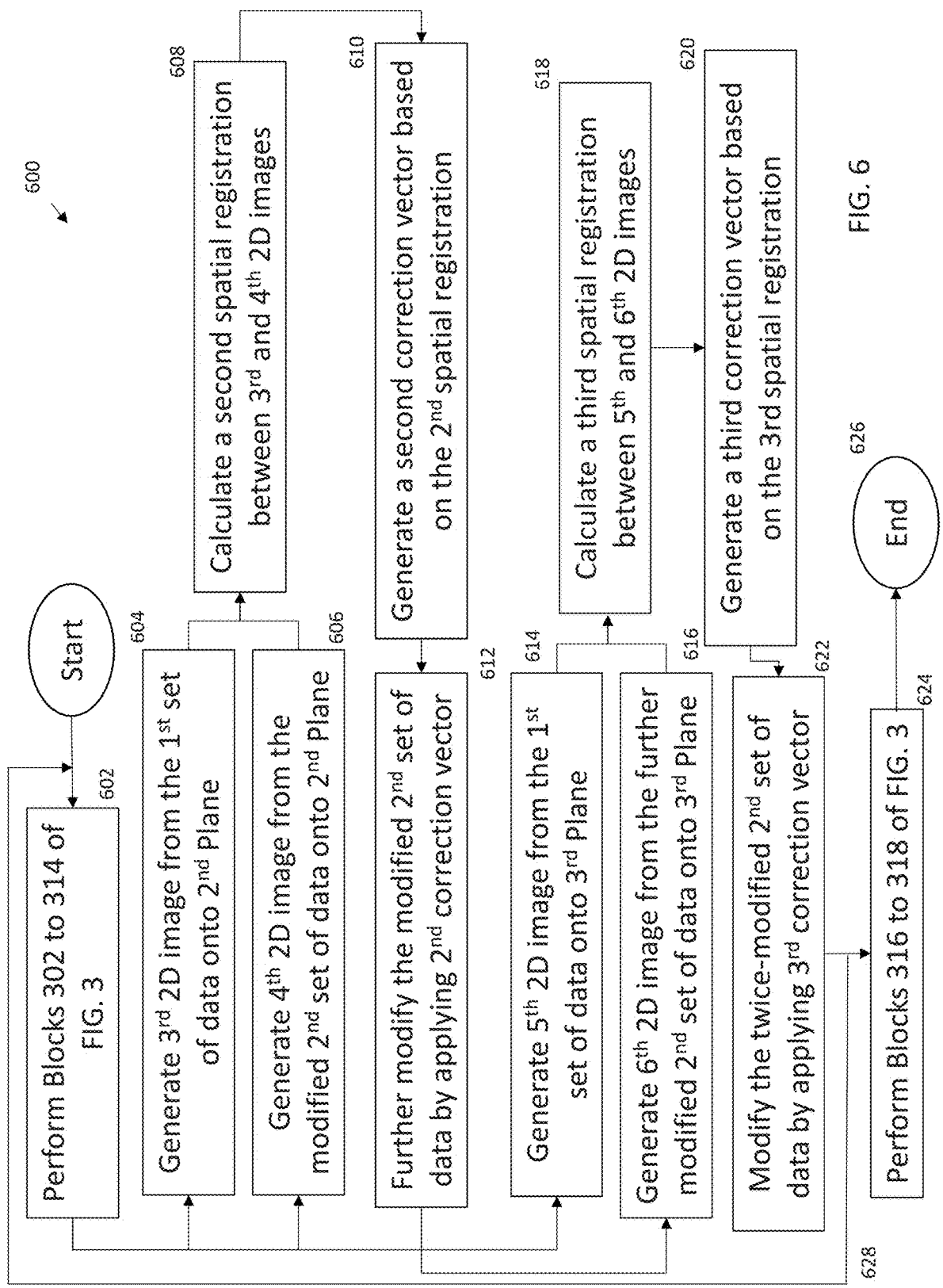
FIG. 6 shows a flowchart for another computer-implemented method for correcting motion from images according to some embodiments.

FIG. 6 illustrates another computer-implemented method 600 of correcting motion from medical images. The primary difference between FIG. 5 and FIG. 6 is that in FIG. 5 each of the various generated 2D images and spatial registrations are generated based on the raw second set of data 3D and, as shown below, FIG. 6 uses an iterative process in which some of the additional 2D projections are based not on the raw second set of data, but rather on the second set of data as modified by a first (or earlier) correction vector(s).

Method 600 begins Block 602, in which Blocks 302 to 314 of FIG. 3 are performed. At Block 314, the second set of data is modified by the correction vector generated in Block 312. At Block 604, a third two-dimensional medical image is generated by projecting the first set of data onto a second plane that is orthogonal to the first plane. At Block 606, a fourth two-dimensional medical image is generated by projecting the second set of data, as modified in Block 314, onto the second plane. At Block 608, a second spatial registration that exists between the third two-dimensional medical image and the fourth two-dimensional medical image in the second plane is calculated. This second spatial registration is used to create a second correction vector in Block 610. At Block 612, the modified second set of data (see Block 314) is further modified by applying the second correction vector to one or more of the datum in the modified (Block 314) second set of data.

At Block 614, a fifth two-dimensional medical image is generated by projecting the first set of data onto a third plane that is orthogonal to the first and second planes. Similarly, at Block 616, a sixth two-dimensional medical image is generated by projecting the further modified (Block 612) second set of data onto a third plane that is orthogonal to the first and second planes. At Block 618, a third spatial registration that exists between the fifth two-dimensional medical image and the sixth two-dimensional medical image in the third plane is calculated. A third correction vector based on the third spatial registration is generated at Block 620. The third correction vector is used, at Block 622, to further modify the modified (Block 612) second set of data.

This iterative process can continue further in method 600. After further modifying the modified (Block 612) second set of data in Block 622, method 600 can proceed to block 624, if the image is sufficiently registered, which can be observed by noting minimal spatial differences between the images, or it can return via line 628 to block 602 if the image is not sufficiently registered. However, Block 602 is modified in that the further modified (Block 622) second set of data is used to generate the second 2D image in the first plane, allowing an iterative modification of the image in the first plane after having modified it through all three planes.

At block 624, Blocks 316 to 318 are performed, and method 600 ends at Block 626.

By iteratively modifying the second set of data as described above with respect to FIG. 6, more effective and reliable motion correction can be made as excessive noise that would occur in a 3D medical image is reduced even more as noise and movement is removed when modifying the (modified) second set of data as already modified with respect to spatial registrations determined earlier.

In some embodiments, the iterative process of method 600 can further include generating an additional 2D imagine on the first plane from the set of second data as modified by the method outlaid in Blocks 602 to 622. This further allows the floating image of the second set of data, as modified, to be further registered to the 2D image of the target first set of data as projected on the first plane, thereby allowing further still reduction in the motion-induced blur in the second set of data. In some embodiments, this iterative process proceeds through each plane multiple times until the floating image is sufficiently registered, which can be observed by noting minimal changes in the modification of a data set. Then the floating image is summed with the target image.

Figure 7:
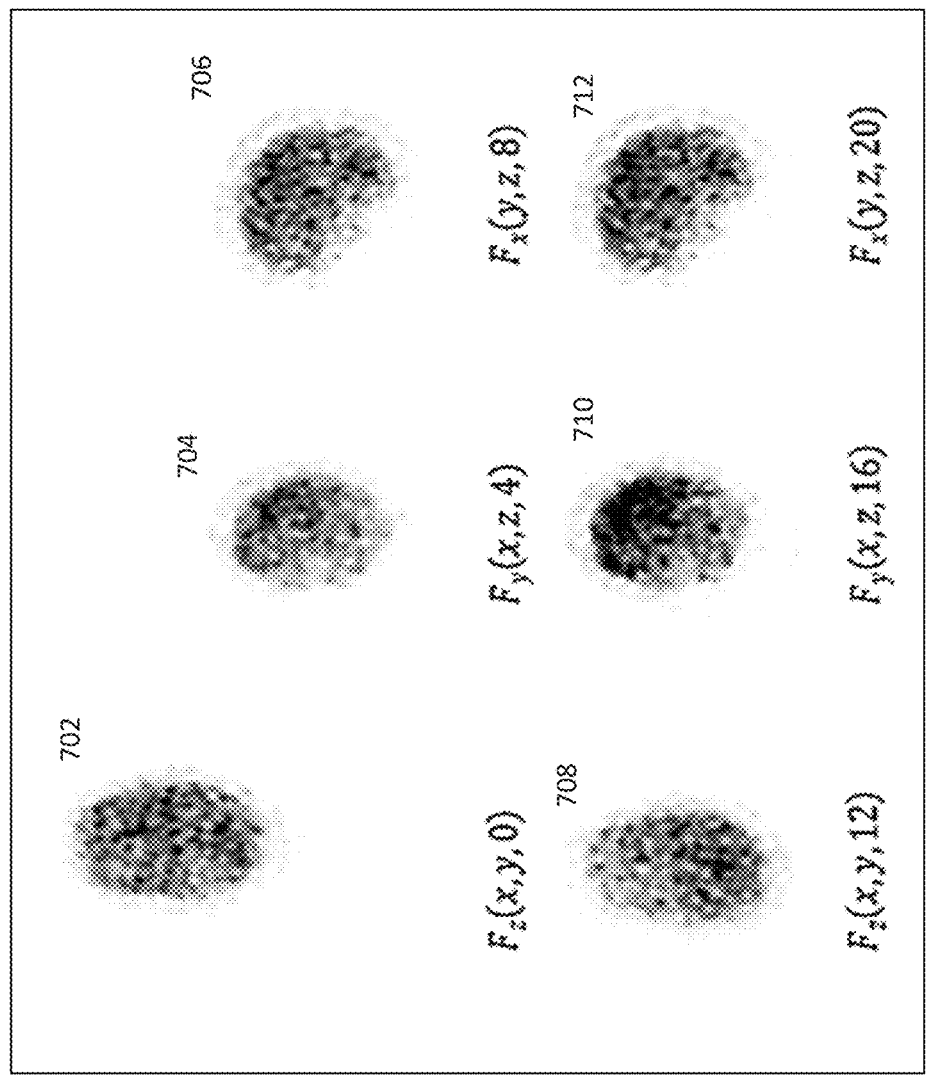
FIG. 7 illustrates the results of an iterative process for correcting motion from images blurriness according to some embodiments.

Referring to FIG. 7, an example 700 of iteratively correcting the motion-induced blurriness in a medical image is illustrated. In example 700, the spatial registration, generation of the correction vector, and modification of the set of data is performed through multiple iterations of the above processes. Each image represents a 2D projection of a modified data set after the indicated number of iterations. For example, image 702, the x-y projection of the raw set of data, image 704 (x-z projection) after 4 iterations, image 706 (y-z projection) after 8 iterations, image 708 (x-y projection) after 12 iterations, image 710 (x-z projection) after 16 iterations and image 712 (y-z projection) after 20 iterations, each projection using the set of data as modified during the previous iterations. As can be seen, this iterative process results in a clearer and more useful images because as the number of iteration increases, the resulted floated image is better aligned to the target image.

Figure 8:
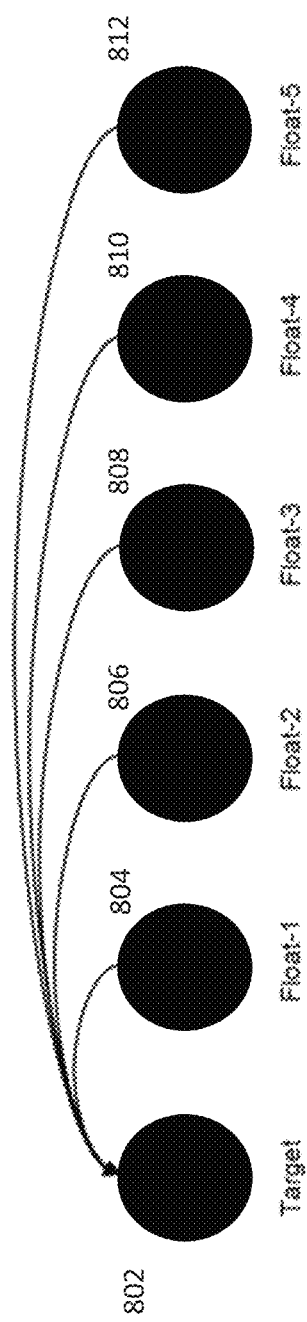
FIG. 8 illustrates the registration of multiple floating images with a single target image according to some embodiments.

While each of the methods describe above with respect to FIGS. 3, 5 and 6 describe the correction of a single floating image (as represented by the second data set) to a target image (as represented by the first data set), these methods are not so limited to the correction of a single floating image with a target image. For example, FIG. 8 illustrates that multiple floating images 804 to 812 (images Float-1 to Float-5, respectively) are each individually corrected to target image 802. Each of these floating images 804 to 812 can be corrected to target image 802 using one of the methods 300, 500, and 600 as described above. However, each of these methods 300, 500 and 600 would include generating a combine set of data that incorporates the modified set of data for each floating image 804 to 812 with the set of data for target image 802.

Figure 9:
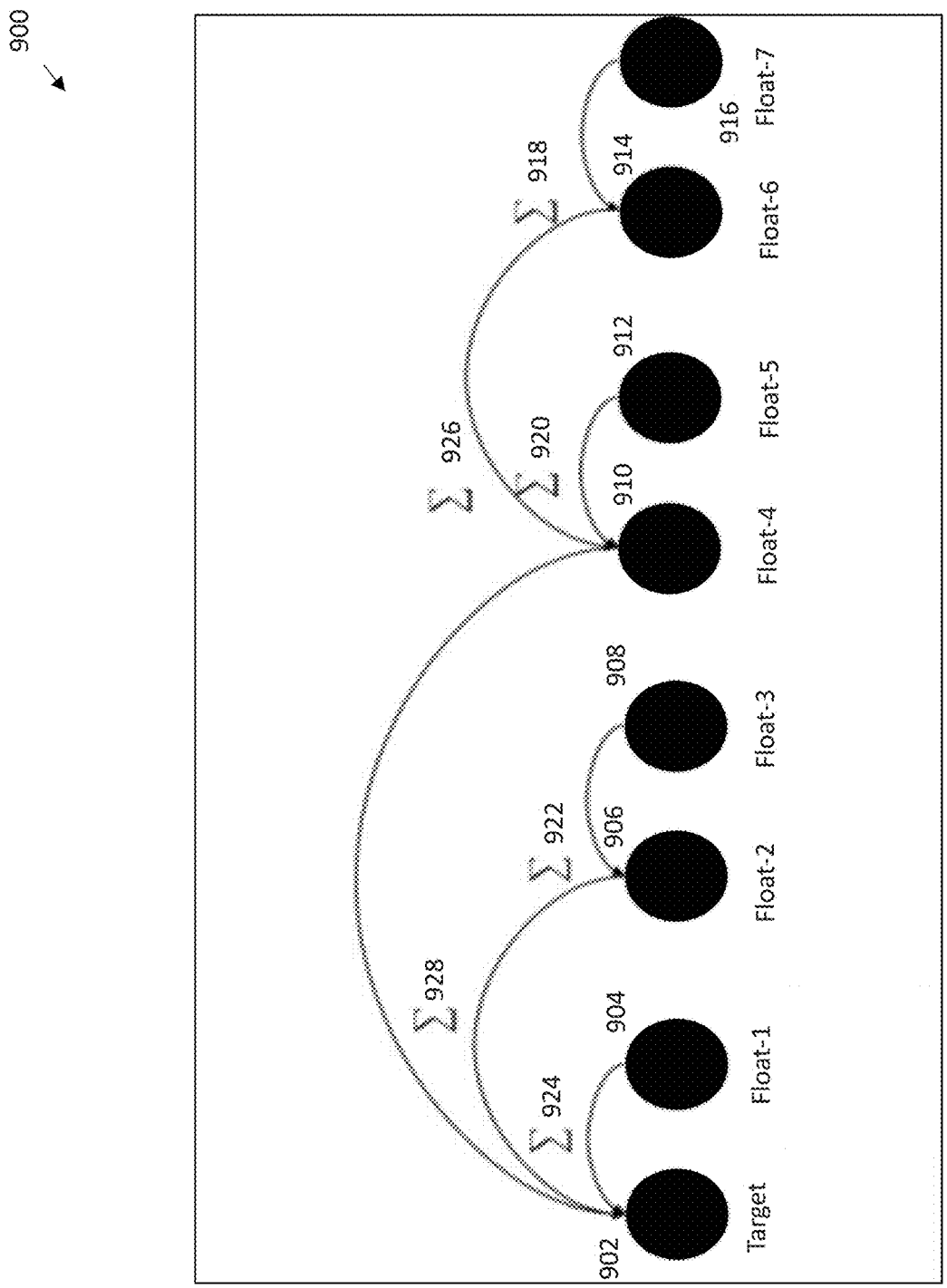
FIG. 9 illustrates the iterative summation of multiple images.

FIG. 9 illustrates a series 900 of corrections among multiple images 902 to 914 generated from raw, uncorrected sets of data of representing three-dimensional medical images, and summed images ("Σ") 918 to 928. Each of these corrections between any two of these images can be performed using one of the methods 300, 500, or 600 described above. For example, floating image 916 ("Float-7") can be corrected to floating image 914 using any of the above methods. In such a correction, floating image 914 ("Float-6") can be considered the target for the correction of image 916. As show in FIG. 9, the "target" image to which a floating image is corrected is the image to which the arrow points, e.g., image 914. Once image 916 has been corrected to image 914, using the above described methods, a new image 918 is generated that is represented by the combined (or summed) set of the data for image 914 and the modified data for image 916. A similar correction process can occur between images 910 and 912 to form image 920, images 906 and 908 to form image 922, and between images 902 and 904 to form image 924. Then, image 918 can be corrected to image 920 to form image 926, and image 922 corrected to image 924 to generate image 928. Finally, images 926 can be corrected to image 928, thereby forming the final set of combined data.

Image 902, having never been corrected to another image, can be considered the overall target image in FIG. 9.

In some embodiments, for example, with respect to disclosure of method 300, image 902 can be formed by a third set of data representing a third three-dimensional medical image that is received from a medical imaging instrument/system's image data acquisition components, such as the scan detectors in PET, SPECT, CT, MRI (or MR), ultrasound, x-ray imaging systems. A two-dimensional medical image can be generated by projecting the third set of data onto the first plane. Another two-dimensional medical image can be generated by projecting the combined set of data onto the first plane formed by, e.g., the correction of image 908 to image 906. A spatial registration can be calculated, as described above, and used to generated another correction vector that is applied to one or more of the datum of the combined set of data, thereby creating a second modified combined set of data comprising the third set of data and modified combined set of data.

The advantage of correcting and combining the data sets of two images (e.g., 914 and 916, neither of which is the final target image 902) is that correction is achievable even if one or both of the two images has insufficient data or two much noise to sum directly to image 902. However, if images 914 and 916 are combined, the resulting corrected image (918) can then be directly, or after further correction, combinable with the final target image (902), thereby allowing correction of the motion-induced blur from data caused by movement of the patient. Image correction can also be complicated by multiple movement events. Each of these events can produce images that are corrected (or correctable) to other images in the same movement event using the herein disclosed methods, thereby providing enough data that the corrected combined data sets of each movement event can be combined with the corrected combined data sets of the other movement events. These corrections result in more efficient and reliable correction of the medical images when compared to traditional methods that struggle with multiple movement events.

While FIG. 9 illustrates one final target image (902) and seven floating images (904-916) that are formed from raw (i.e., uncorrected) sets of data representing a three-dimensional medical image, the methods disclosed herein are not so limited to these specific numbers, and can be applied to any number of data sets. Each data set can be iteratively modified, using any one of the above disclosed methods, to correct the motion within that data set to a target image, and add that corrected data set to a combined set of data comprising multiple corrected data sets of multiple. The methods can be iteratively used until all data sets are corrected, or sufficiently registered, to a "final" target image.

Figure 10:
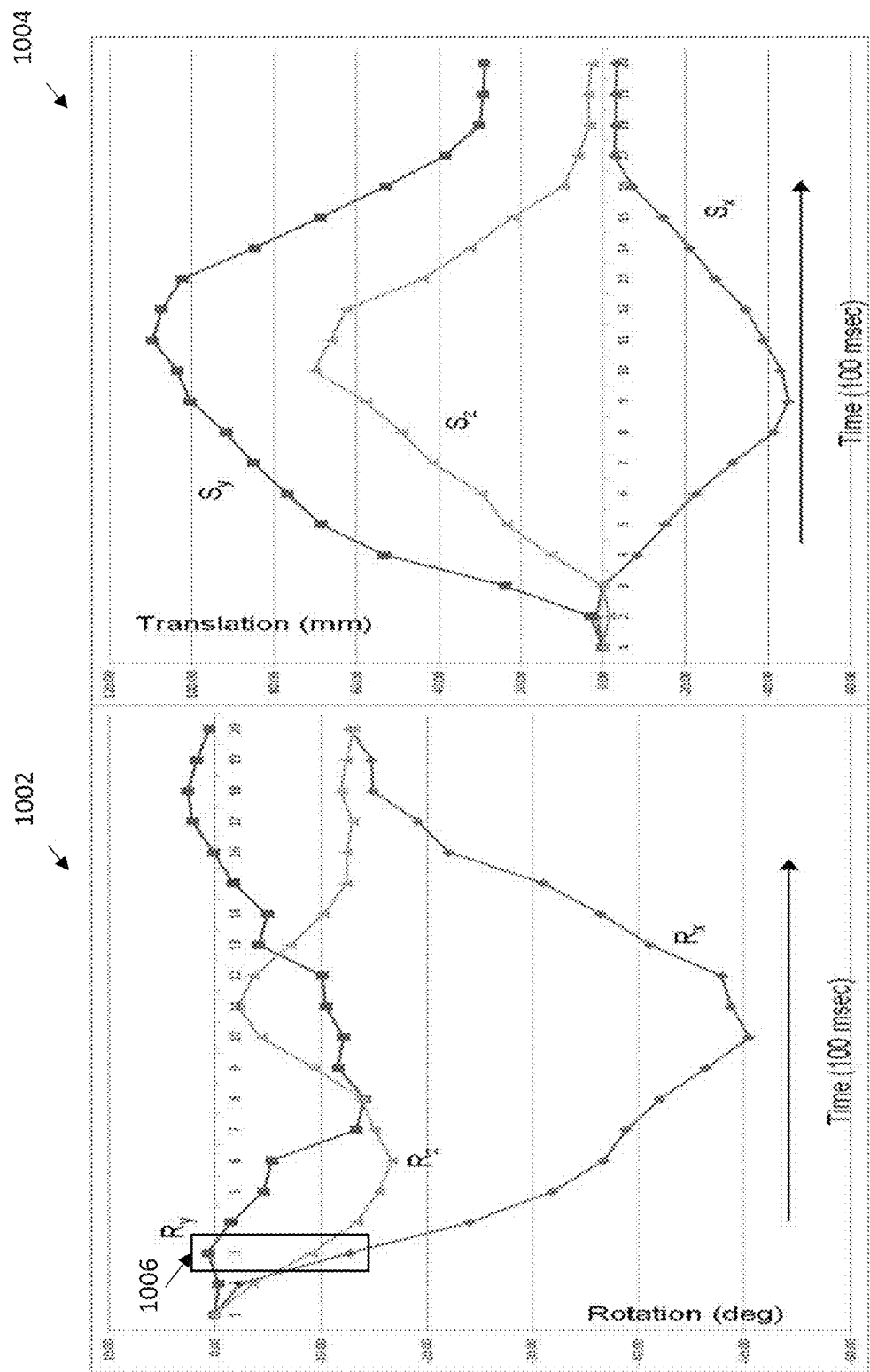
FIG. 10 illustrates graphs of the rotation and translation corrections used to account for patient motion using methods according to some embodiments.

With reference to FIGS. 1 and 2A to 2C, a brain PET scan was performed during which a patient sneezed, resulting in blurred image in frame 106 and the scattered data of 200A to 200C. Utilizing the techniques described above, the two-second frame 106 was divided into a series of 100 msec frames, each of which provided a set of data that formed a 3D medical images. These images were compared and corrected to one another by projecting the data for each onto a series of planes, calculating spatial registrations, generating correction vector using the above described methods, modifying data sets, and generating combined data sets. This process was iterated, resulting in the values of FIG. 10. Graph 1002 represents the final rotation by axis (i.e., $R_y$ is the rotation about the y axis, $R_z$ around the z axis and $R_x$ around the x-axis) applied to the set of data for each 100 msec frame. For example, the values in box 1006 show, from top to bottom, the rotation of the data set for the third 100 msec frame around the y, z and x axis. As seen in 1002, no rotation value is applied to the first 100 msec frame because that frame was the target image.

Similarly graph 1004 shows the x, y, and z translations ($S_x$, $S_y$, and $S_z$) of each of these frames as determined by the methods disclosed herein. Together, graphs 1002 and 1004 represent the effective correction vector used to modify the data set of the respective frames to remove the effects of the patient motion.

Figure 11:
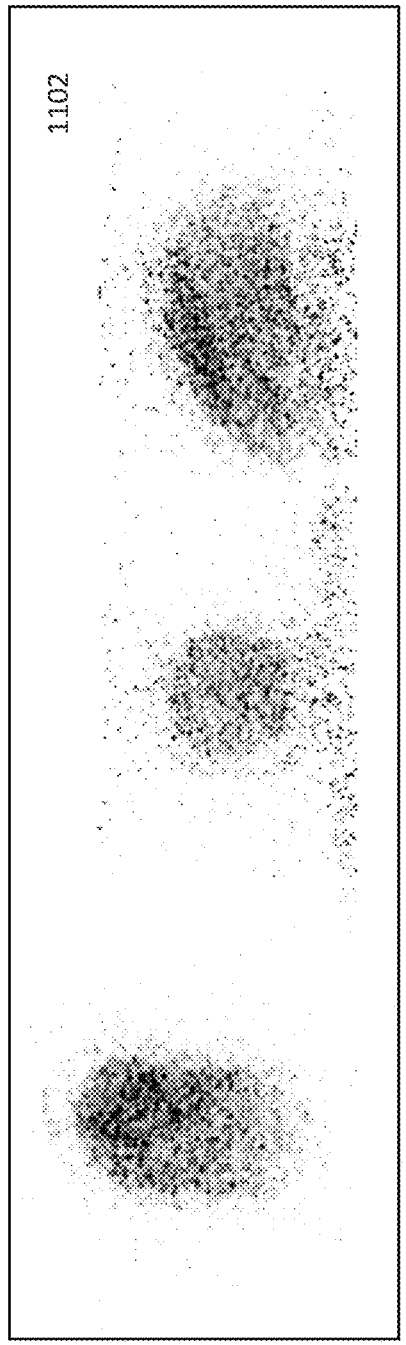
FIG. 11 compares various views of a medical image without correction to various views of an image as corrected by using the rotations and translations of FIG. 10.
Figure 11:
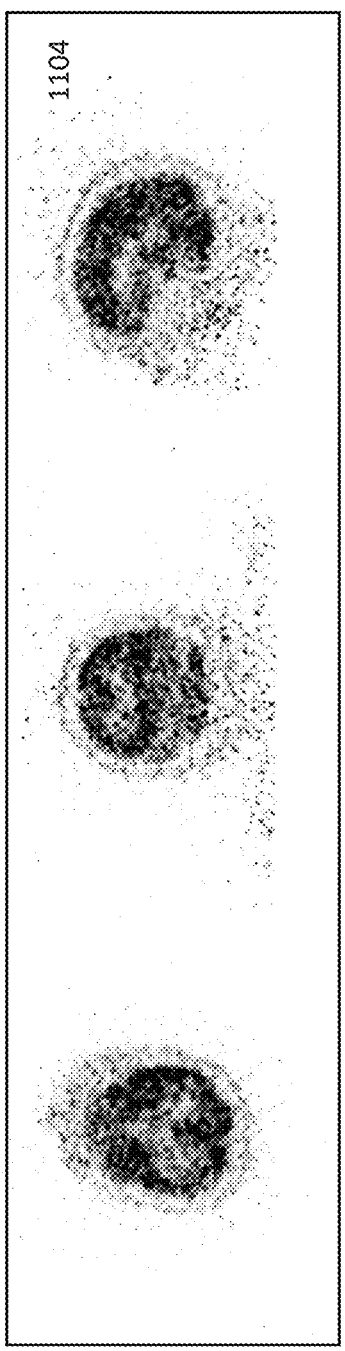

FIG. 11 demonstrates the effectiveness of methods disclosed herein at correcting the data from frame 106 to remove the effects of motion. The group of images in box 1102 represent the 2D projections of the raw (i.e., without motion correction) data forming frame 106 onto three orthogonal planes. The images in box 1104 are produced by applying the respective rotational and translational corrections (see FIG. 10) to each frame, generating a combined data set comprising the target data set and the modified data sets of the other 19 frames within frame 106, and then projecting this combined data set onto the same three orthogonal planes as the images in box 1104. As can be seen, there is a marked improvement in image clarity, resulting in medically significant information for analysis and diagnosis. Prior methods of correcting these images would have been unable to correct for this motion, leading to either the unclear images like those in box 1102, or discarding of this data.

Figure 12:
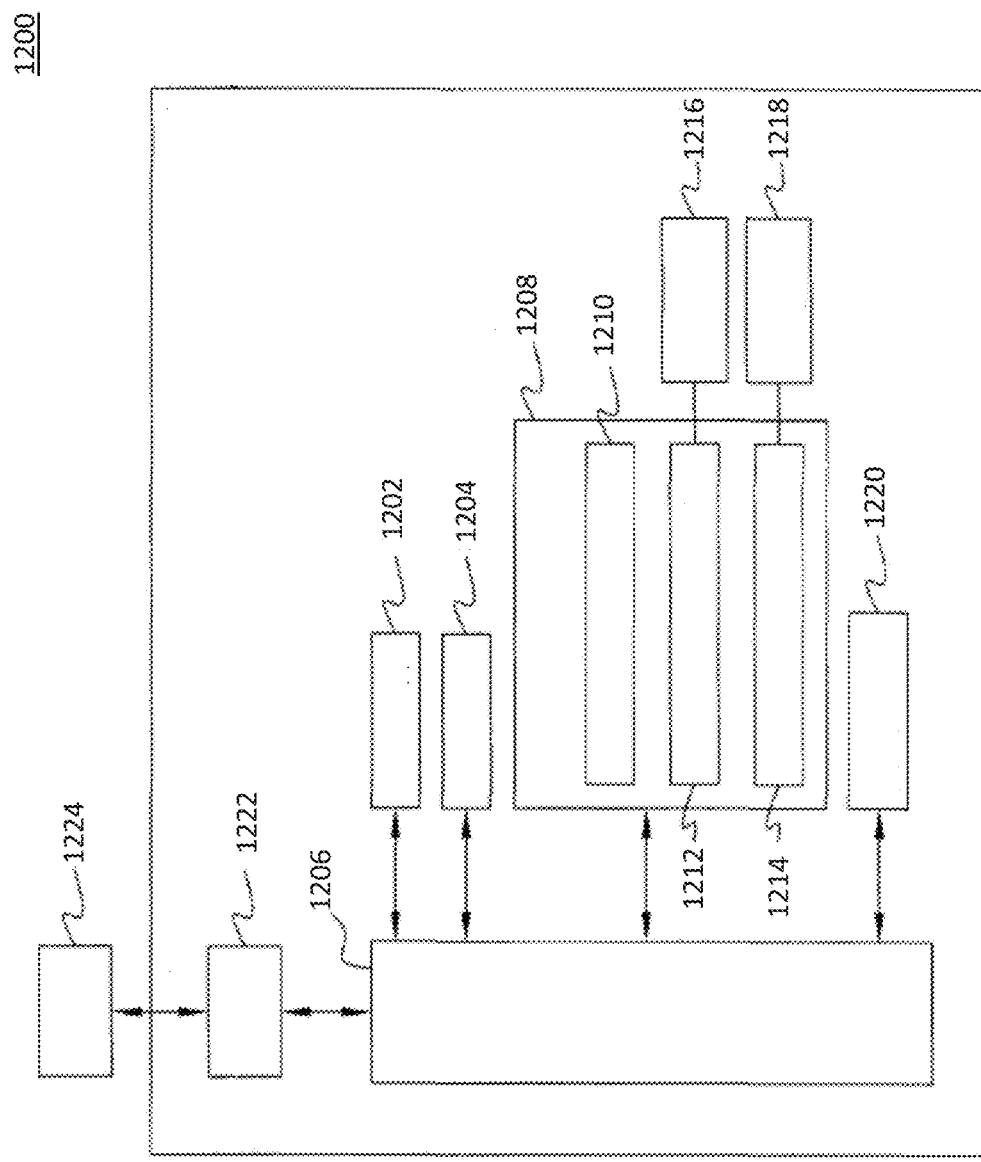
FIG. 12 is an architecture diagram of a system that can be used for implementing the methods disclosed herein according to some embodiments.

FIG. 12 is an architecture diagram of a system 1200 that can be used in some embodiments, e.g., for implementing the methods disclosed herein. Computer system 1200 can include one or more processors 1202. Each processor 1202 is connected to a communication infrastructure 1206 (e.g., a communications bus, cross-over bar, or network) that provides an interface for the communication of information between the various directly and indirectly connected components of system 1200. Computer system 1200 can include a display interface 1222 that forwards graphics (e.g., 2D and 3D medical images), text, and other data from the communication infrastructure 1206 (or from a frame buffer, not shown) for display on the display unit 1224 to a user.

Computer system 1200 can also include a main memory 1204, such as a random access memory (RAM), and a secondary memory 1208. The secondary memory 1208 can include, for example, a hard disk drive (HDD) 1210 and/or removable storage drive 1212, which can represent a floppy disk drive, a magnetic tape drive, an optical disk drive, a memory stick, or the like as is known in the art. The removable storage drive 1212 reads from and/or writes to a removable storage unit 1216. Removable storage unit 1216 can be a floppy disk, magnetic tape, optical disk, memory stick, or the like. As will be understood, the removable storage unit 1216 can include a computer readable storage medium having tangibly stored therein (embodied thereon) data and/or computer software instructions, e.g., for causing the processor(s) to perform various operations, to include the methods disclosed herein.

In alternative embodiments, secondary memory 1208 can include other similar devices for allowing computer programs or other instructions to be loaded into computer system 1200. Secondary memory 1208 can include a removable storage unit 1218 and a corresponding removable storage interface 1214, which can be similar to removable storage drive 1212, with its own removable storage unit 1216. Examples of such removable storage units include, but are not limited to, USB or flash drives, which allow software and data to be transferred from the removable storage unit 1216, 1218 to computer system 1200.

The above memory systems are configured to store, either on a more temporary or permanent basis, the various sets of data representing the 3D medical images, both in its raw form from a medical imaging instrument and as modified by the processor(s) 1202. Additionally, these memories can store data and/or computer software instructions, e.g., for causing the processor(s) to perform the methods disclosed herein.

Computer system 1200 can also include a communications interface (e.g., networking interface) 1220. Communications interface 1220 allows software and data to be transferred between computer system 1200 and external devices, e.g., to other remote and/or external computer systems and medical imaging instruments. In some embodiments, computer system 1200 can be a part of a medical imaging system that includes the medical imaging instruments/systems include the image data acquisition components, such as the scan detectors in PET, SPECT, CT, MRI (or MR), ultrasound, x-ray imaging systems. Examples of communications interface 1220 can include a modem, Ethernet card, wireless network card, a Personal Computer Memory Card International Association (PCMCIA) slot and card, or the like. Software and data transferred via communications interface 1220 can be in the form of signals, which can be electronic, electromagnetic, optical, or the like that are capable of being received by communications interface 1220. These signals can be provided to communications interface 1220 via a communications path (e.g., channel), which can be implemented using wire, cable, fiber optics, a telephone line, a cellular link, a radio frequency (RF) link and other communication channels.

In some embodiments, the methods disclosed herein can be stored as instructions in a non-transitory computer readable storage medium, e.g., removable storage unit 1216. When the stored instructions are executed by the processor 1202 (or processors) in the system 1200, it causes the system 1200 to perform the methods 300, 500, and/or 600. For example, processor 1202 is configured to received various sets of raw data representing three-dimensional medical image from a medical imaging instrument/system's image data acquisition components, such as the scan detectors in PET, SPECT, CT, MRI (or MR), ultrasound, x-ray imaging systems, generate two-dimensional medical images by projecting the raw set of data onto a one or more planes, calculate a spatial registration that exists between two images, generate a correction vector based on the spatial registration, modify data sets by applying the correction vector, and generate combined sets of data representing a processed three-dimensional medical image by combining the a target set of data and a modified second set of data.

Furthermore, display interface 1222 can cause display 1224 to display medical images according to the herein disclosed methods, and communication interface 1220 can be used to receive data sets from imaging devices/apparatuses and to transmit combined data sets externally, e.g., to an external computer system.

However, the non-transitory computer readable medium, e.g., removable storage unit 1216, is not limited to being used in just computer system 1200, and can be used in many other systems or apparatuses such that the instructions embodied tangibly thereupon when executed are configured to cause one or more processors of those systems to perform the methods 300, 500 and/or 600 described herein.

In any of the preceding embodiments, the disclosed methods can further comprise receiving a plurality of data sets from a medical imaging instrument, each data set representing additional three-dimensional images, wherein each data set of the plurality of data sets is iteratively used to generate an additional 2D image onto the first plane, calculate an additional spatial registration that exists between the additional 2D image of respective data set and a 2D image generated from any previously derived combined set of data, generate an additional correction vector based on the additional spatial registration, modify the respective data set of the plurality of data sets by applying the additional correction vector, and generate a further modified combined set of data by combining the respective modified data set with the previously derived combined data set.

In any of the preceding embodiments, the method may further comprise performing the steps of the immediately preceding paragraph in two additional planes, each additional plane orthogonal to the first plane and to other additional plane.

In any of the preceding embodiments, the described sets of data may be produced from a medical imaging instrument can be one of a PET, SPECT, CT, MR, x-ray, and an ultrasound imaging system.

In any of the preceding embodiments, the generation of a correction vector can be based one or more of any of the calculated spatial registrations.

In any of the preceding embodiments, calculating the spatial registrations can comprises measuring a translation of the second two-dimensional medical image relative to the first two-dimensional medical image and measuring a rotation of the second two-dimensional medical image relative to the first two-dimensional medical image.

In any of the preceding embodiments, a combined set of data, containing one or more datum corrected to reduce and/or remove the effects caused by target motion, may be transmitted to an external computer system.

In any of the preceding embodiments, the combined set of data may be displayed as a 3D rendering of the set of data.

Described above are methods and systems for correcting motion-induced blurriness in medical images. These methods and systems result in clearer, more effective, and more efficiently generated medical images for all types of medical imaging, and in particular in situations of extreme and/or rapid motion occurring in a short period of time for low count-rate scans (such as a low dose brain PET scan). Such methods and systems can further be used with data driven motion detection as well as artificial intelligence motion correction.

Although the subject matter has been described in terms of exemplary embodiments, it is not limited thereto. Rather, the appended claims should be construed broadly, to include other variants and embodiments, which can be made by those skilled in the art within the scope and range of equivalents of the claims.

What is claimed is:

1. A computer-implemented method of processing medical image data, the method comprising:
   receiving a first set of data representing a first three-dimensional medical image produced by a medical imaging instrument;
   receiving a second set of data representing a second three-dimensional medical image produced by the medical imaging instrument;
   generating a first two-dimensional medical image by projecting the first set of data onto a first plane;
   generating a second two-dimensional medical image by projecting the second set of data onto the first plane;
   calculating a first spatial registration that exists between the first two-dimensional medical image and the second two-dimensional medical image in the first plane;
   generating a first correction vector based on the spatial registration;
   modifying the second set of data by applying the correction vector to one or more of the datum in the second set of data; and
   generating a first combined set of data representing a processed three-dimensional medical image by combining the first set of data and the modified second set of data;
   receiving a third set of data representing a third three-dimensional medical image produced by the medical imaging instrument;
   generating a third two-dimensional medical image by projecting the third set of data onto the first plane;
   generating a fourth two-dimensional medical image by projecting the first combined set of data onto the first plane;
   calculating a second spatial registration that exists between the third two-dimensional medical image and the fourth two-dimensional medical image in the first plane;
   generating a second correction vector based on the second spatial registration;
   modifying the combined set of data by applying the second correction vector to one or more of the datum in the combined set of data; and generating a second combined set of data representing a second processed three-dimensional medical image by combining the third set of data and the modified combined set of data.

2. The computer-implemented method of claim 1, wherein the medical imaging instrument is one of a PET, SPECT, CT, MR, x-ray, and an ultrasound imaging system.

3. The computer-implemented method of claim 1, further comprising:
generating a third two-dimensional medical image by projecting the first set of data onto a second plane orthogonal to the first plane;
generating a fourth two-dimensional medical image by projecting the second set of data onto the second plane;
calculating a second spatial registration that exists between the third two-dimensional medical image and the fourth two-dimensional medical image in the second plane;
generating a fifth two-dimensional medical image by projecting the first set of data onto a third plane orthogonal to both the first and second planes;
generating a sixth two-dimensional medical image by projecting the second set of data onto the third plane;
calculating a third spatial registration that exists between the fifth two-dimensional medical image and the sixth two-dimensional medical image in the third plane; and
wherein generating the correction vector is further based on the second and third spatial registrations.

4. The computer-implemented method of claim 3, wherein generating the correction vector based on the first, second, and third spatial registrations comprises combining the vectors of the first, second, and third spatial registrations with one another.

5. The computer-implemented method of claim 1, further comprising:
receiving a plurality of data sets from the medical imaging instrument, each data set representing additional three-dimensional images, wherein each data set of the plurality of data sets is iteratively used to generate an additional 2D image onto the first plane, calculate an additional spatial registration that exists between the additional 2D image of respective data set and a 2D image generated from any previously derived combined set of data, generate an additional correction vector based on the additional spatial registration, modify the respective data set of the plurality of data sets by applying the additional correction vector, and generate a further modified combined set of data by combining the respective modified data set with the previously derived combined data set.

6. The computer-implemented method of claim 1, wherein calculating the spatial registrations comprises:
measuring a translation of the second two-dimensional medical image relative to the first two-dimensional medical image; and
measuring a rotation of the second two-dimensional medical image relative to the first two-dimensional medical image.

7. The computer-implemented method of claim 1, further comprising transmitting the combined set of data to an external computer system.

8. The computer-implemented method of claim 1, further comprising displaying an image as defined by the combined set of data.

9. A system for processing data for a medical image, said system comprising:
a processor configured to:
receive a first set of data representing a first three-dimensional medical image produced by a medical imaging instrument;
receive a second set of data representing a second three-dimensional medical image produced by the medical imaging instrument;
generate a first two-dimensional medical image by projecting the first set of data onto a first plane;
generate a second two-dimensional medical image by projecting the second set of data onto the first plane;
calculate a spatial registration that exists between the first two-dimensional medical image and the second two-dimensional medical image in the first plane;
generate a correction vector based on the spatial registration;
modify the second set of data by applying the correction vector to one or more of the datum in the second set of data; and
generate a combined set of data representing a processed three-dimensional medical image by combining the first set of data and the modified second set of data; and
a memory configured to store sets of data representing three-dimensional medical images produced by a medical imaging instrument; and
a communication interface configured to transmit the combined set of data to a location external to the system and receive sets of data representing three-dimensional medical images produced by the medical imaging instrument.

10. The system of claim 9, wherein said processor is further configured to:
receive a third set of data representing a third three-dimensional medical image;
generate a third two-dimensional medical image by projecting the third set of data onto the first plane;
generate a fourth two-dimensional medical image by projecting the combined set of data onto the first plane;
calculate a second spatial registration that exists between the third two-dimensional medical image and the fourth two-dimensional medical image in the first plane;
generate a second correction vector based on the second spatial registration;
modify the combined set of data by applying the second correction vector to one or more of the datum in the combined set of data; and
generate a second combined set of data representing a second processed three-dimensional medical image by combining the third set of data and the modified combined set of data.

11. The system of claim 9, wherein said system further comprises a display configured to display two-dimensional and three-dimensional medical images.

12. A non-transitory computer readable medium comprising instructions embodied tangibly therein, the instructions when executed configured to cause one or more processors to perform the operations of:
receiving a first set of data representing a first three-dimensional medical image produced by a medical imaging instrument;
receiving a second set of data representing a second three-dimensional medical image produced by the medical imaging instrument;
generating a first two-dimensional medical image by projecting the first set of data onto a first plane;
generating a second two-dimensional medical image by projecting the second set of data onto the first plane;

calculating a first spatial registration that exists between the first two-dimensional medical image and the second two-dimensional medical image in the first plane;

generating a first correction vector based on the spatial registration;

modifying the second set of data by applying the correction vector to one or more of the datum in the second set of data; and generating a first combined set of data representing a processed three-dimensional medical image by combining the first set of data and the modified second set of data;

receiving a third set of data representing a third three-dimensional medical image produced by the medical imaging instrument;

generating a third two-dimensional medical image by projecting the third set of data onto the first plane;

generating a fourth two-dimensional medical image by projecting the first combined set of data onto the first plane;

calculating a second spatial registration that exists between the third two-dimensional medical image and the fourth two-dimensional medical image in the first plane;

generating a second correction vector based on the second spatial registration;

modifying the combined set of data by applying the second correction vector to one or more of the datum in the combined set of data; and generating a second combined set of data representing a second processed three-dimensional medical image by combining the third set of data and the modified combined set of data.

13. The non-transitory computer readable medium of claim 12, wherein the instructions when executed are configured to cause one or more processors to further perform the operations of:

generating a third two-dimensional medical image by projecting the first set of data onto a second plane orthogonal to the first plane;

generating a fourth two-dimensional medical image by projecting the second set of data onto the second plane;

calculating a second spatial registration that exists between the third two-dimensional medical image and the fourth two-dimensional medical image in the second plane;

generating a fifth two-dimensional medical image by projecting the first set of data onto a third plane orthogonal to both the first and second planes;

generating a sixth two-dimensional medical image by projecting the second set of data onto the third plane;

calculating a third spatial registration that exists between the fifth two-dimensional medical image and the sixth two-dimensional medical image in the third plane; and wherein generating the correction vector is further based on the second and third spatial registrations.

14. The non-transitory computer readable medium of claim 12, wherein generating the correction vector based on the first, second, and third spatial registrations comprises combining the vectors of the first, second, and third spatial registrations with one another.

15. The non-transitory computer readable medium of claim 12, wherein the instructions when executed are configured to cause one or more processors to further perform the operations of:

receiving a plurality of data sets from the medical imaging instrument, each data set representing additional three-dimensional images, wherein each data set of the plurality of data sets is iteratively used to generate an additional 2D image onto the first plane, calculate an additional spatial registration that exists between the additional 2D image of respective data set and a 2D image generated from any previously derived combined set of data, generate an additional correction vector based on the additional spatial registration, modify the respective data set of the plurality of data sets by applying the additional correction vector, and generate a further modified combined set of data by combining the respective modified data set with the previously derived combined data set.

16. The non-transitory computer readable medium of claim 12, wherein calculating the spatial registrations comprises:

measuring a translation of the second two-dimensional medical image relative to the first two-dimensional medical image; and measuring a rotation of the second two-dimensional medical image relative to the first two-dimensional medical image.

17. The non-transitory computer readable medium of claim 12, wherein the instructions when executed are configured to cause one or more processors to further perform the operations of transmitting the combined set of data to an external computer system.

* * * * *